United States Patent [19]
Stubbs et al.

[11] Patent Number: 5,071,661
[45] Date of Patent: Dec. 10, 1991

[54] PROCESS FOR DEHYDRATING POTATO PRODUCTS

[75] Inventors: Clifford A. Stubbs, Iona; Miles J. Willard, Idaho Falls, both of Id.

[73] Assignee: Miles J. Willard, Idaho Falls, Id.

[21] Appl. No.: 581,034

[22] Filed: Sep. 12, 1990

[51] Int. Cl.$^5$ ........................ A23B 7/03; A23L 1/2165
[52] U.S. Cl. ........................ 426/96; 426/102; 426/272; 426/273; 426/292; 426/293; 426/464; 426/473; 426/637
[58] Field of Search .............. 426/96, 102, 272, 273, 426/292, 293, 296, 637, 464, 473

[56] References Cited

U.S. PATENT DOCUMENTS

| Re. 27,531 | 12/1972 | Murray et al. | |
| Re. 31,982 | 9/1985 | Beck et al. | 426/550 |
| 2,786,763 | 3/1957 | Rivoche | |
| 2,791,508 | 5/1957 | Rivoche | |
| 3,208,851 | 9/1965 | Antinori et al. | |
| 3,410,702 | 12/1968 | Frank | |
| 3,427,951 | 2/1969 | Mitan et al. | |
| 3,514,294 | 5/1970 | Klug et al. | |
| 3,527,646 | 9/1970 | Scheick et al. | |
| 3,597,227 | 8/1971 | Murray et al. | |
| 3,634,105 | 1/1972 | Beck et al. | |
| 3,635,729 | 1/1972 | Englar et al. | |
| 3,650,766 | 3/1972 | Smadar | |
| 3,650,776 | 3/1972 | Tschirgi | |
| 3,669,674 | 6/1972 | Klug et al. | |
| 3,723,137 | 3/1973 | Fischer et al. | |
| 3,725,087 | 4/1973 | Miller et al. | |
| 3,751,268 | 8/1973 | Van Patten et al. | |
| 3,865,964 | 2/1975 | Kellermeier et al. | 426/307 |
| 3,991,222 | 11/1976 | Beck et al. | 426/550 |
| 4,109,020 | 8/1978 | Gorfien et al. | 426/241 |
| 4,218,485 | 8/1980 | Lee et al. | 426/296 |
| 4,219,575 | 8/1980 | Saunders et al. | 426/242 |
| 4,272,553 | 6/1981 | Bengtsson et al. | 426/241 |
| 4,317,842 | 3/1982 | El-Hag et al. | 426/302 |
| 4,456,624 | 6/1984 | Glantz et al. | 426/96 |
| 4,456,624 | 6/1984 | Glantz et al. | 426/96 |
| 4,551,340 | 11/1985 | El-Hag et al. | 426/437 |
| 4,559,232 | 12/1985 | Glatz et al. | 426/96 |
| 4,559,923 | 12/1985 | Glantz et al. | 426/96 |
| 4,590,080 | 5/1986 | Pinegar | 426/441 |
| 4,632,838 | 12/1986 | Doenges | 426/441 |
| 4,683,141 | 7/1987 | Lewis et al. | 426/639 |
| 4,828,856 | 5/1989 | Willard | 426/272 |
| 4,844,919 | 7/1989 | Szwerc | 426/94 |
| 4,931,296 | 6/1990 | Shanbhag et al. | 426/243 |
| 4,931,298 | 6/1990 | Shanbhag et al. | 426/296 |
| 4,961,940 | 8/1988 | Hansson | 426/102 X |

FOREIGN PATENT DOCUMENTS 3602062  8/1987  Fed. Rep. of Germany ...... 426/102

Primary Examiner—Arthur L. Corbin
Attorney, Agent, or Firm—Stephen A. Gratton; Robert A. de Groot

[57] ABSTRACT

A process for dehydrating food products particularly suited to the dehydration of potatoes for use in the preparation of hashbrown potatoes. In accordance with the process of the invention, a food product, e.g. a potato is prepared into separate pieces for drying. The separate pieces are then coated with a dry mixture which includes a separation particulate which maintains separation between adjacent pieces such that the pieces may be more efficiently and effectively hot air dried. The dry mixture also includes ingredients which react with moisture on the food product surface to form an adhesive surface for adhering the dry mixture to the food product. For the preparation of hashbrown potatoes, the dry mixture may include spices, browning ingredients, and patty-binding ingredients. For the preparation of casserole potato dishes, the dry mixture may include spices, dehydrated vegetables and cheeses, and a thickening agent.

45 Claims, 6 Drawing Sheets

PROCESS FOR DEHYDRATING POTATO PRODUCTS

FIELD OF THE INVENTION

The present invention relates generally to a dehydration process for food products particularly suited to dehydrating potatoes for use in the preparation of hashbrown potatoes.

BACKGROUND OF THE INVENTION

Hashbrown potatoes are typically prepared by forming elongated strands or shreds of fresh cut potatoes into a patty which is then fried on both sides. Cutting, shredding, or grating potato pieces into elongated strands to form the patties ruptures the potato cells and releases free starch. This free starch acts as a binder which adheres the individual potato strands to one another to form a patty and maintain the patty intact when it is turned to fry both sides.

Another critical feature of hashbrowns is their ability to brown during the cooking operation to provide the browned hashbrown coloring on both sides of the patty. Difficulties in producing the desirable browned color are encountered with potatoes for several months after harvesting, as these potatoes have not yet developed sufficient level of reducing sugars. The browning of the adhesive mixture of potato shreds provides the flavor and consistency that makes hashbrown potatoes so unique and appealing.

Many attempts have been made in the past to formulate dry or dehydrated hashbrown potato products which duplicate the appearance and flavor of fresh-made hashbrowns. U.S. Pat. No. 4,828,856 to Willard, for instance, discloses a method for forming a dehydrated fabricated potato product for use in the preparation of hashbrown potatoes. Other methods of making similar dry hashbrown products are disclosed in U.S. Pat. Nos. 3,634,105 and 3,991,222 to Beck; 3,725,087 to Miller; 3,410,702 to Frank; 3,635,729 to Englar; and 3,650,776 to Tschirgi.

Another form of dehydrated potatoes which can be fried to produce "home fried" potatoes are thin slices. These slices are traditionally used for making casserole dishes such as scalloped potatoes. Because of the longer rehydration time required for the thicker potato slices, they are not as well favored by institutional users for the preparation of home fries. For those who do prefer this shape, the problems of adhesion and optimum sugar content for browning are the same as described for shredded hashbrown products.

In general, each of the above-noted patents involve dehydrating the potato by hot air drying. Typically, this involves a processing step in which a bed of potatoes (either fresh or reconstituted) are placed in a multistage, conveyer belt dryer and subjected to heated air for a period of several hours. As is known to those skilled in the art, processing and heating the potatoes diminishes the potato flavor of the final product.

This processing problem is compounded by the use of binder materials which may be added during processing of the potatoes to enable formation of stable patties during final cooking. The Englar '729 and Tschirgi '776 patents, for instance, teach the use of free starches which may be applied in an aqueous solution to the processed potatoes before completion of the drying process. This binder may cause the processed potatoes to also bind together during the dehydration process. This requires additional heating to heat the bound strands of processed potato pieces and causes further loss of flavor and additional costs for the final product. Additionally, with the use of a binder, processing problems such as clumping and the formation of "blow holes" within a potato bed and adherence of the potatoes to parts of the processing equipment may also occur.

The Frank '702 patent approached this prior art problem by adding a potato binder (made by drying cooked potatoes that had been riced into small strands) to conventionally diced or shredded potatoes after they had been dried. This process produced a product having a non-homogenous mealy texture. In addition, the previously mentioned processing problems associated with prolonged heating for drying the potatoes were still present.

As is apparent, there is a need in the art for a dehydration process in which food products can be economically and efficiently dehydrated in a minimum time to reduce flavor loss to a minimum. Additionally, there is a need in the art for an economical processed dehydrated potato product which functions in the same manner as a fresh-made hashbrown potato patty and in which the potato flavor of the final product has not been lost in processing. The novel and unique dehydration process of the present invention satisfies these prior art needs. Moreover, dehydrated hashbrown potatoes processed in accordance with the process of the present invention closely resemble the appearance and texture of fresh-made hashbrown potatoes and can be easily rehydrated and prepared by an end user.

SUMMARY OF THE INVENTION

In accordance with the present invention, a process for dehydrating food products especially suited for processing dehydrated hashbrown potatoes is disclosed. The process, simply stated, includes the steps of: preparing separate pieces of a food product for dehydration; forming an adhesive surface on the separate pieces of the food product; coating the adhesive surface of the food product with a separation particulate in order to maintain separation of the food product pieces to form an air pathway for heated air flow between the separated pieces; drying the separated food product pieces to reduce the moisture content thereof to below about 10%. The dehydrated food product pieces can then be packaged as a shelf-stable item and reconstituted by immersion in water for use by an end user in final cooking preparation of potato dishes.

The process of the invention is particularly suited to the formation of elongated potato strands or shreds which may be rehydrated and cooked as hashbrown potatoes. It is contemplated, however, that potatoes may be cut into sizes and shapes and processed for uses other than for the formation of hashbrown, such as slices used for making casserole dishes such as scalloped potatoes.

In accordance with an illustrative embodiment of the invention for forming hashbrown potatoes, as an initial step, fresh potatoes are first prepared for dehydration. This typically includes the steps of cutting, shredding, or slicing whole fresh potatoes into elongated shreds suitable for the formation of hashbrown potatoes.

As a next step, the potato shreds are washed to remove free starches, blanched to inactivate enzymes, and then washed again. These steps can be accomplished by techniques which are known in the art.

An adhesive coating is then formed on the surface of potato shreds. The adhesive coating may be formed by techniques which are known in the art and may be in the form of pregelatinized starches formed as a film, a film of polymerized alginate, or simply residual native potato starches. In a preferred form of the invention, the adhesive coating is formed by dry ingredients included in a dry mixture containing the separation particulates and which react in the presence of moisture on the potato shreds to form an adhesive surface.

The dry mixture also contains the separation particulate. The separation particulate is preferably in the form of particulate foodstuff which adheres to the adhesive surface of the potato shreds. The separation particulate may be formed of various foodstuff particles such as crushed potatoes or corn or dehydrated potato particles. The separation particulate functions to maintain separation of the individual potato shreds so that the potato shreds may be more efficiently and uniformly air dried for dehydration.

The particulate-separated potato shreds can be dehydrated by conventional drying, such as with a heated-air conveyer dryer, to a moisture content of about 10%. Separation of the individual potato shreds by the separation particulate forms spaces or an air pathway for air flow around each potato strand. This facilitates moisture loss from the potato shreds to the heated air and, in general, increases the efficiency and uniformity of the drying process. This in turn decreases the processing time and lessens loss of potato flavor from the processed potato pieces. Additionally, the separated potato shreds are not subjected to clumping and isolated "blow holes" are greatly minimized within a bed of potato shreds being air dried. Moreover, the particulate-laden potato shreds are heavier and easier to handle than unprocessed shreds.

In addition to containing particulate foodstuffs which function to maintain separation of the individual potato shreds and adhesive forming ingredients, the dry mixture may also include patty-binding ingredients, browning ingredients, flavorings, preservatives, and antioxidants. These additional ingredients may be formulated to be activated during the high heat of final cooking by an end user. Since these additional ingredients are adhered to the surface of the potato pieces during processing, separate mixing of spices by an end user is not required.

Many other objects, advantages, and capabilities of the present invention will become apparent as the description proceeds.

DETAILED DESCRIPTION OF THE PREFERRED EMBODIMENT

Figure 1:
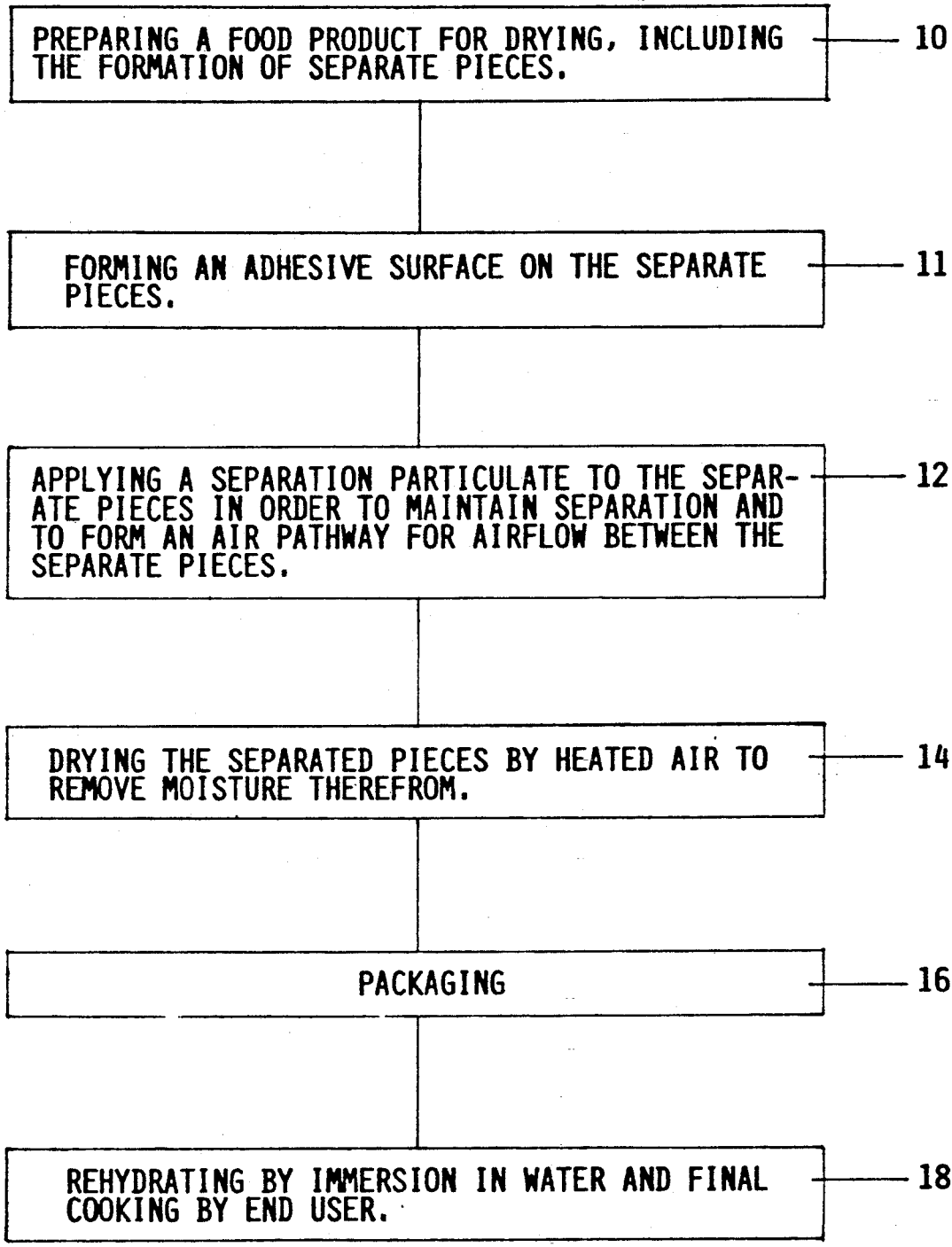
FIG. 1 is a flow diagram of a process for dehydrating a food product in accordance with the invention.

Referring now to FIG. 1, a process for dehydrating a food product in accordance with the present invention is shown. The process broadly stated includes the steps:

preparing a food product for dehydration, including the formation of separate pieces of the food product, step 10;

forming an adhesive surface on the separate pieces of food product, step 11;

applying a separation particulate to the adhesive surface of the separate pieces of food product in order to maintain separation and form air pathways between adjacent pieces, step 12; and drying the separated pieces to remove moisture therefrom, step 14.

The dried food product pieces are then packaged, step 16, and can be rehydrated by immersion in water, step 18, prior to final cooking by an end user.

A critical step of the process is step 12 in which a separation particulate is applied to the surface of the food product in order to maintain separation of the separate pieces of food product and provide an air pathway to allow air flow therebetween during the drying step, step 14. Maintaining separation of the separate food product pieces increases the efficiency and uniformity of the drying process and allows the end product to be more effectively and economically produced.

Prior to application of the separation particulate, step 12, an adhesive surface must first be formed on the surface of the food product, step 11, in order to adhere the separation particulate to the separate pieces of food product. This may be done by techniques which are known in the art. For instance (and as taught in U.S. Pat. No. 3,527,646 to Scheick), a dry powder containing one or more pregelatinized starches may be added to the separation particulate or to a dry mixture containing the separation particulate and reacted with a moist surface of the food product pieces to form an adhesive film. Alternately, an adhesive surface may be formed from the polymerization of alginate and calcium salt which may be included within the dry mixture and reacted in the presence of moisture on the food product surface to form an adhesive surface. Additionally, gums or other mucilaginous substances may also be used to form an adhesive surface. For potato food products, an adhesive surface may simply be formed by native potato starches formed on the potato surface by cutting the potato into separate pieces.

Water or moisture may be present on the surface of the food product pieces because during preparation the food product pieces are typically washed. The water or moisture must be present in sufficient quantities to allow the necessary chemical reaction for forming or polymerizing the adhesive surface to occur. Conversely, there must not be so much water on the food product pieces that the dry separation particulate mixture is washed away prior to formation of an adhesive surface.

Figure 2:
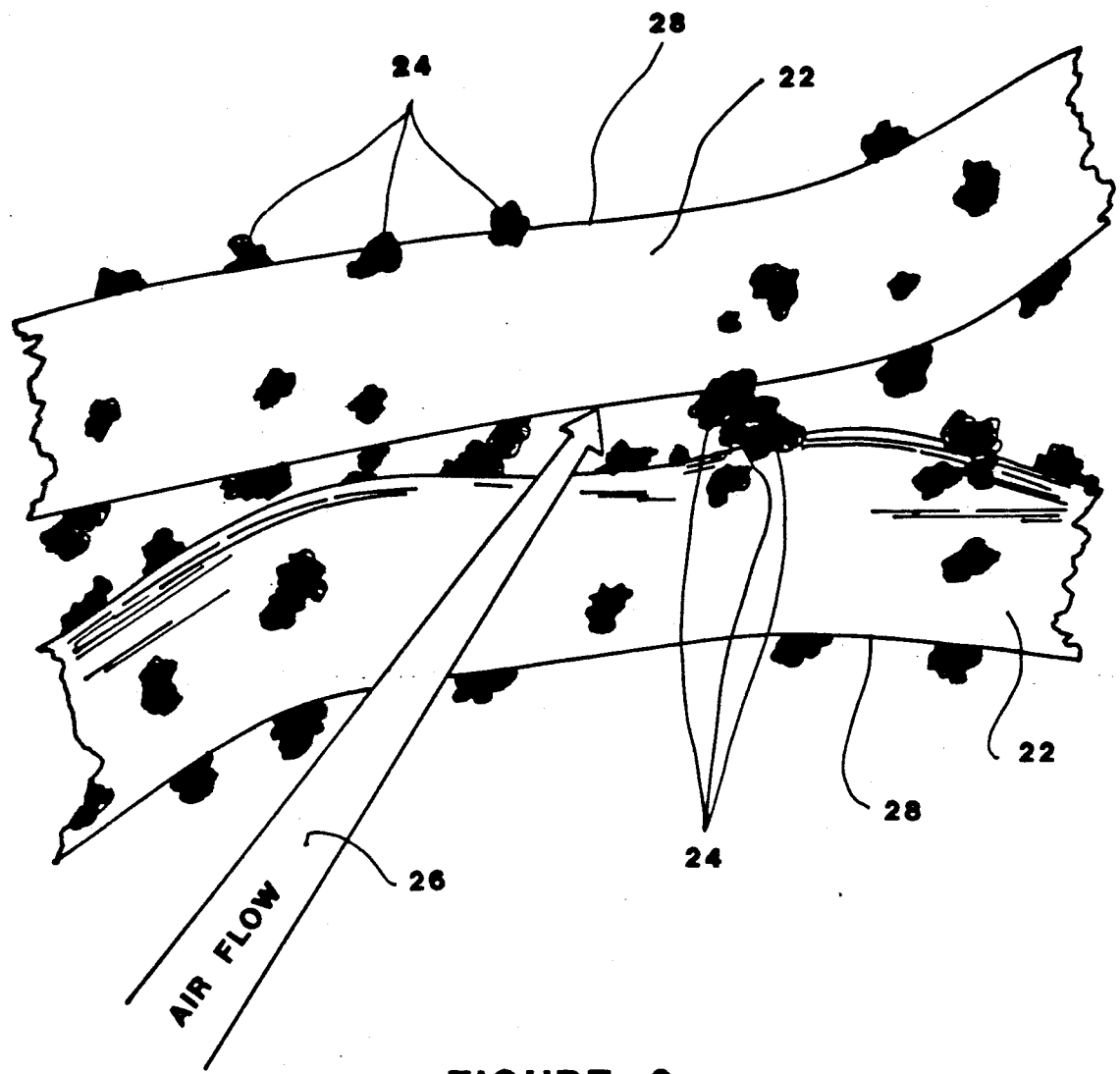
FIG. 2 is an enlarged side-elevation view of portions of adjacent food product pieces in which separation of the food product pieces is maintained in accordance with the invention during drying of the food product pieces.

With reference to FIG. 2, an enlarged cross-section of separate food product pieces 22 having an adhesive surface 28 and a separation particulate 24 formed thereon are shown. For the purpose of illustration, the food product pieces 22 and the separation particulate 24 are shown with a greatly enlarged size in FIG. 2. In practice, the separation particulate may be sized in the range of a fine powder passing through a U.S. 40 mesh sieve (0.42 mm diameter) to particles having a diameter of about 1/32 inch or passing through a U.S. 20 mesh sieve (0.841 mm). Use of larger particles facilitates the separation of the particulate materials from the surfaces of the dried piece during drying and handling. As shown in FIG. 2, the separation particulate 24 is comprised of a plurality of irregularly shaped individual particles.

The separation particulate 24 functions to maintain separation of the individual food product pieces 22 to provide an air pathway therebetween such that air flow (denoted by arrow 26 in FIG. 2) for drying the food product pieces, step 14, can be more easily directed through and around the individual pieces 22. This increases the rate of heat transfer by convection and increases the efficiency of drying the food product pieces 22.

The separation particulate 24 may be formed of any food product compatible particulate foodstuff which remains as a particle solid and does not totally dissolve in water from the moist surface of the food product (e.g., salt particles would be ineffective). By way of example and not by limitation, some suitable foodstuff particles may be raw granular starches (potato, corn, or other), crushed or milled potato particles, or dehydrated potato particles. Other granular or powdered edible particles may also be suitable for this application, provided the material functions to adhere to the surface of the potato pieces 22 and maintain separation of the individual potato pieces 22 to provide an air pathway therebetween.

Once the individual food product pieces 22 have been coated with the separation particulate 24, the food product pieces 22 can be air dried, step 14, to a moisture content of less than about 10% and preferably about 7% for potato products. The food product pieces may be dehydrated by equipment and procedures which are known in the art. As an example, potato pieces may be hot-air dried in a belt conveyer dryer such as a Proctor and Schwartz conveyer dryer or the like, which subjects a moving bed of potato pieces to a hot air stream of from about 150° to 225° F. for a period of from about 1 to 4 hours.

The drying or dehydration time of food product pieces processed in accordance with the invention may be decreased significantly, over similar unprocessed food product pieces. Additionally, the separated food product pieces tend not to bind together in moist clumps as with conventional uncoated food product pieces, and a rate of throughput through a conveyer dryer or the like can be proportionately increased. Moreover, the overall drying process is more uniformly accomplished and the formation of "blow holes" through a bed of food product pieces is minimized. ("Blow holes" being air conduits through a bed of food product pieces which provide a short circuit for air flow and detract from air distribution and the overall efficiency of the drying process.)

After the food product pieces 22 have been dried to a moisture content of less than about 10%, they can be packaged for storage. In this dehydrated form, the food product pieces are a shelf stable food product and can be simply packaged in plastic bags or the like.

Prior to final cooking, the food product pieces 22 must be rehydrated by an end user, step 18. For rehydration, the food product pieces 22 may be placed in cold tap water and allowed to remain overnight for use the following morning, or by placing in hot water for a shorter period. The food product pieces, when rehydrated to a ratio of 4 parts rehydrated weight for 1 part dry weight, are returned to approximately the same original dimension of the food product pieces with a texture that is not tough or leathery, or soft and mushy. The food product pieces can then be prepared in conventional dishes.

Embodiment II: Hashbrown Embodiment

Figure 3:
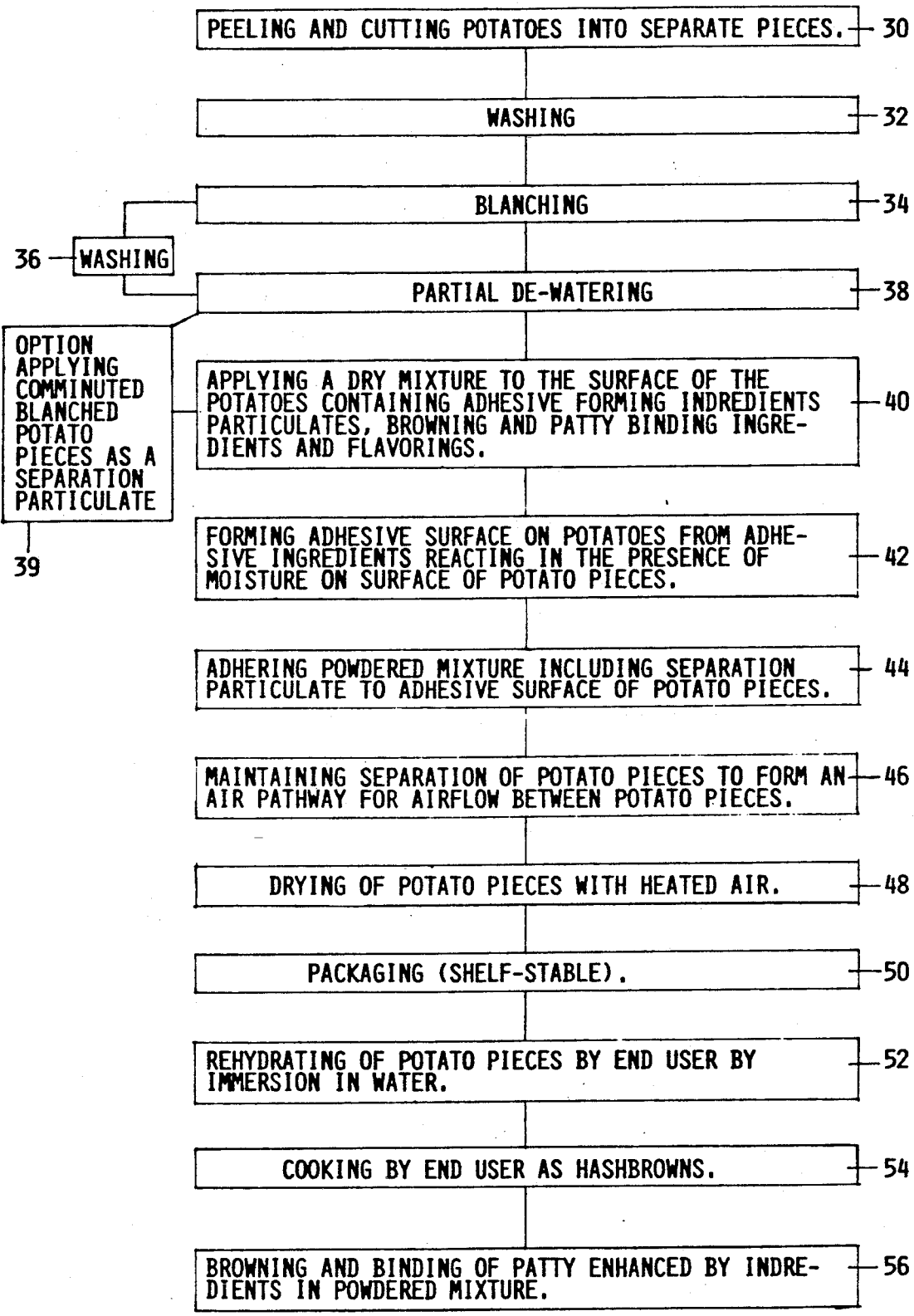
FIG. 3 is a flow diagram of a process for dehydrating potatoes in accordance with the invention for use as hashbrown potatoes.

Referring now to FIG. 3, a process for producing potato strands or shreds in accordance with the invention and suitable for use as hashbrown potatoes is illustrated. In general, for producing a hashbrown potato product, the process is the same as previously described for a food product piece but with the addition of a dry mixture containing the separation particulate as well as browning ingredients for the hashbrowns, and patty-binding ingredients for forming the hashbrowns into patty form. Flavoring in the form of spices or the like may also be added. These additional ingredients are mixed with the separation particulate in a dry mixture and adhere to the adhesive surface of the potato pieces or shreds as does the separation particulate. Those additional ingredients with non-dissolving character which maintain their particulate character in a moist environment may also function as a separation particulate for maintaining separation of the potato shreds during drying. The patty-binding ingredients and browning ingredients, as will hereinafter be more fully explained, are activated by the high temperature used for cooking the hashbrowns by an end user. Since the flavorings or spices are adhered to the surface of the potato shreds during processing, a final end user need not further season or add spices to the mixture, which adds to the convenience of the final product.

With reference to FIG. 3, as a first step of the process, fresh whole potatoes are peeled, trimmed, and cut into elongated thin strands, shreds, or strips, step 30. A typical strip size may be 1/16 inch in diameter by 2 inches long. By way of example, a suitable slice may be a model CC Urschel slicer manufactured by URSCHEL Manufacturing Company, Valparaiso, Ind.

Following the preparation step, step 30, the elongated shreds are washed in cold water to remove surface starch, step 32. Following washing, the shreds are blanched by conventional blanching equipment 32. As is known in the art, blanching heats the potato tissue throughout at time and temperature conditions high enough to inactivate the enzymes which would otherwise cause oxidative darkening of the potato tissue, but not sufficient to soften the tissue enough for normal consumption. Normal blanching conditions range from about 2 to 6 minutes at about 170° F. or 190° F. (77° C. to 88° C.). After blanching, the potato shreds may optionally be washed again, step 36.

The blanched shreds are then partially de-watered of surface moisture by suitable means such as draining or drum spinning, step 38. Preferably, excess water is removed from the shreds, but the potato shreds still contain enough moisture to enable formation of an adhesive surface from the dry mixture including the separation particulate to be added in the following steps.

Following de-watering, a dry mixture containing the separation particulate, adhesive-forming ingredients, browning and binding ingredients, and spices is mixed with the potato shreds, step 40, so that the moist exposed surfaces of the shreds are uniformly covered by the dry mixture. This can be accomplished by metering the dry mixture onto the shreds as they pass through a rotating coating drum or alternately by other suitable means. The dry particulate is preferably distributed uniformly on all of the exposed surfaces of the potato shreds and coats the potato shreds. As previously stated, the dry mixture may include the separation particulate, dry spices, and patty-forming and browning ingredients for the hashbrowns. The dry mixture may be on the order of 2 to 8 percent of the total weight of the blanched shreds-dry mix blend. This corresponds to a dry mix content on the order of 8 to 26 percent of the total weight of finished, dried product.

In addition to forming a separated product, the dry mixture adds weight to the potato shreds. This improves the handling of the potato shreds during processing, helps prevent the formation of "Blow holes" in a bed of potato shreds during the drying step, step 48, and provides a more formable bulk density for packaging. Further, the dry mixture absorbs and retains extra water during rehydration by the end user which is necessary for activation of patty forming ingredients, and also produces a less leathery, more moist, natural tasting end product.

For adhering the dry mixture to the surface of the potato shreds, an adhesive coating or film is formed on the surface of the separate potato shreds, step 42. As previously explained, this may be accomplished by reaction of the adhesive particles which may be included in the dry mixture with moisture on the surface of the potato shreds.

An adhesive material for adhering the separation particulate flavorings, spices, browning, and patty-binding ingredients is a gelatinized starch. The most available source is the residual potato starch on the surfaces of the cut potato pieces following blanching and washing. The amount and consistency of this starch may vary, however, due to the conditions of the potatoes, the extent of blanching, and the extent of washing following blanching. While satisfactory adhesion of the particulates has been accomplished using a potato's own residual starch, it is deemed best to add a dry powdered pregelatinized starch to the dry mixture. Such starches that have been tested successfully include pregelatinized potato and corn starch, and modified starches such as Bakasnak Starch (National Starch & Chemical), Ultra-Sperse Starch (National Starch & Chemical), Ultra-Tex Starch (National Starch & Chemical), and Mira-Thik 469 Starch (A. E. Staley Manufacturing).

The preferred means of forming an adhesive surface is including in the dry mixture a gel forming reactive mixture of a food-grade polyvalent salt (cationic), such as calcium or aluminum salt, and anionic hydrocolloid, such as algin or low-methoxyl pectin. It is well known in the art that polyvalent salts react with hydrocolloids containing anionic sites, cross-linking closely aligned hydrocolloids, thus forming insoluble gels. Calcium salts are preferred cross-linking agents.

Effective levels of polyvalent salt-gelling hydrocolloid are between 0.5% to 5%, by weight, of dry mix (all components except food being dried); 1.5% hydrocolloid being a preferred level. Polyvalent salt levels in dry mix, sufficient to cause desired gelling, must be adjusted to compliment the polyvalent salt-gelling hydrocolloid level.

Polyvalent salt levels may be in the range of 20% to 80% of the level of polyvalent salt-gelling hydrocolloid. When using a preferred polyvalent salt-gelling hydrocolloid level of 1.5% by weight of dry mix, a polyvalent salt level of 0.54% of dry mix weight has been found effective.

With the formation of an adhesive surface, the separation particulate contained within the dry mixture adheres to the separate potato shreds and maintains separation of the separate potato shreds, step 46.

The separation particulates can be any insoluble food stuff. Dry particulates, however, which are slow to absorb water, thus maintaining their basic physical particulate character in a moist environment are most suitable for this application. Additionally, the separation particulate must be compatible to the finished food product.

By way of illustration, and not limitation, examples of suitable separation particulates are as follows:

Raw crystalline starches including potato starch, corn starch, tapioca starch, etc. These ingredients serve the dual purpose of separating the potato shreds during drying and also furnishing adhesive quality to the reconstituted shreds during preparation. For example, at the moment of frying the potato shreds of this invention, water is available at the surface such that, when the surface temperature of the rehydrated shreds exceeds the gelatinization temperature of the starches (150° F.–170° F.), a starch gel forms, providing an adhesive film for bonding the shreds. This results in patty formation to a degree not possible in normally prepared dried potato shreds, which lack sufficient native surface starch for developing well-defined patties. Crispness is also significantly improved.

Other suitable starches include specialty starches, such as Amylomaize VII Starch (American Maize Co.) and Textaid Starch (National Starch & Chemical). Specialty starches can serve the dual purpose of separating the potato shreds during drying and also impart their own respective qualities of increased crispness, patty forming film, or enhanced internal texture (mealiness) to the final grilled/cooked product.

It has been found that dehydrated potato products can also be used to coat the surfaces of the potato shreds. These can include dehydrated mashed potatoes in any convenient form such as potato granules, potato flakes, potato buds, or crushed dehydrated potato pieces, preferably ground to a size less than about 1/32 of an inch in diameter or to pass a 20 mesh (0.0328 inch or 833 mm) sieve. Particles larger than this function well as air pathway forming particulates, but tend to separate during drying and handling of the finished product. For a more uniform-appearing finished product, a crushed dehydrated potato passing through a 40 mesh (0.0165 inch or 425 mm) screen is preferred.

It has also been found that it is possible to add back previously dried whole shredded potatoes (add-back shreds) to the treated shreds, including previously dried shreds made by the process of this invention. This can be done after partial de-watering, step 38, of the process whereat the shreds are still moist. When added at a ratio of between 1% and 20% (basis: dry weight of add-back/wet weight of treated shreds) to the moist, washed, dewatered treated shreds, before drying, the add-back shreds rapidly absorb water from the treated wet shreds and partially hydrate. This creates a textural change to the shreds mixture resulting in significantly more, and larger, air pathways between shreds, resulting in more rapid drying and less shred-to-shred adhesion. Absorption of water by the dry shreds during the first stages of drying is such that undesirable browning of the add-back shreds is avoided. Products made in this matter have shown drying rates significantly faster than the rates achieved with smaller separation particulates. As an example, it has been found that add-back of 5% dehydrated potato shreds to wet potato shreds by weight will result in reduction of first stage drying time in a multi-stage drier of about 38% compared to potato shreds treated with small particulates, and about 60% faster than plain, wet, untreated, conventional potato shreds.

Comminuted, blanched and dewatered potato particles may also be added to the shreds as a separation particulate. Starting with raw, whole potatoes, these comminuted potato particles will typically have a moist surface (i.e., native moisture of whole potatoes). The moist potato particles can be added to the potato shreds after dewatering, step 38, and prior to covering the shreds with the dry mixture, step 40. This optional step is shown as step 39 in the flow diagram of FIG. 3.

After treatment with the dry mixture, the potato shreds can then be air dried to a moisture content of less than 10% and preferably about 7%, step 48. A suitable drying arrangement involves depositing the potato shreds in layers of several inches thick on a two-stage conventional Proctor And Schwartz conveyer dryer. The particulate separated potato shreds tend not to matt down or stick together, minimizing resistance to drying air, resulting in improved efficiency of the drying process.

The dried potato shreds can then be packaged in plastic bags, sealed cartons, boxes, or other suitable means, step 50. Potatoes processed in this matter are shelf-stable under normal distribution conditions and do not require refrigeration.

For use by an end user, the potato shreds must be rehydrated by an end user, step 52. This can be simply accomplished by immersion of the potato shreds in cold tap water and allowing the shreds to remain overnight for use the following morning, or by placing in hot water for a shorter period. The potato shreds, when rehydrated to a ratio of 4 parts rehydrated weight for 1 part dry weight, are returned to approximately the same original dimension of blanched raw cut potatoes with a texture that is typical of natural, fresh potato shreds, not tough or leathery, or soft and mushy.

Figure 4:
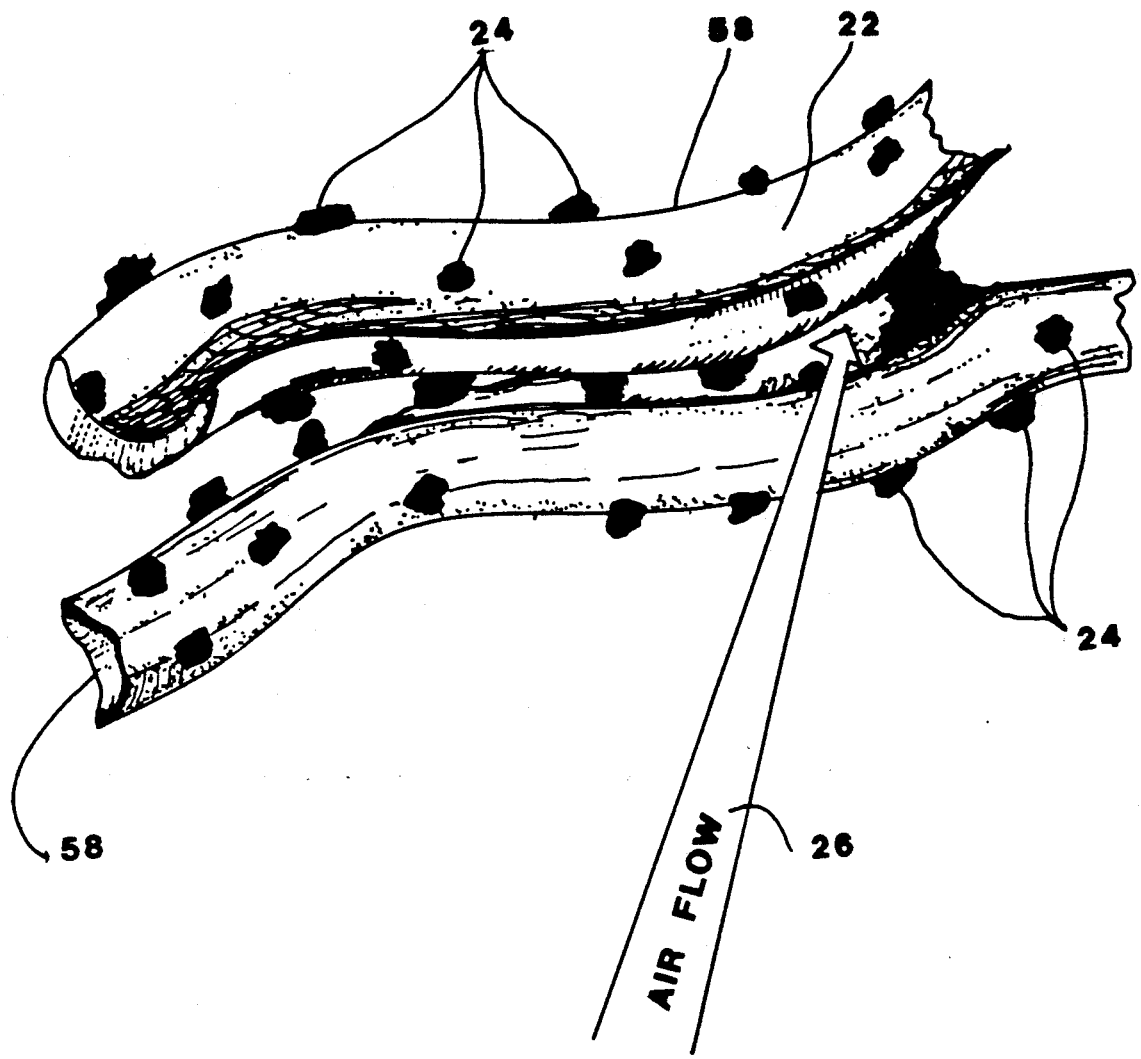
FIG. 4 is a perspective view of a potato strand shaped to provide an increased surface area for rehydration.

It has been determined that potato shreds formed with relatively larger surface areas can be more efficiently rehydrated during step 52. One such suitable cross-sectional shape for the potato shreds 58 is shown in FIG. 4. As is apparent, a generally cup-shaped (either concave or convex) cross-sectional configuration provides a relatively larger surface area for water absorption than a generally square, rectangular, or triangular cross-section and thus improves the efficiency of the rehydration step, step 52.

The rehydrated potato shreds can then be prepared in conventional dishes. As previously stated, further seasoning or mixing of spice packets is not necessary as the dry mixture containing flavorings or spices adheres to the surface of the potato shreds, even though the rehydration step, step 52.

The rehydrated hashbrown potatoes can, for instance, be cooked by an end user by frying on a heated, oiled surface, step 54, or by other conventional means. During cooking, browning and patty-binding ingredients present in the separation particulate are activated by the relatively high cooking temperatures to produce a browned hashbrown patty, step 56.

Embodiment III: Slices and Other Dehydrated Potato Pieces

The invention may also be practiced with sliced dehydrated potatoes, normally cut 0.125 inch to 0.0625 inch thick from small potatoes typically called "eliminators". The invention may also be practiced with other sizes and shapes of dehydrated potatoes such as, for example, a generally square piece measuring 0.750"×0.750"×0.125" or 0.25"×1.0"×0.375", etc. Because of the popularity of casseroles prepared from dehydrated sliced potatoes for both retail and institutional feeding, the discussion will be directed toward the application of the invention to sliced dehydrated potatoes of about 0.125" thickness.

Thinly sliced potatoes have been used traditionally to prepare baked casseroles known as scalloped potatoes or au gratin potatoes by combining milk, cheese, or other vegetables such as onions and green peppers. A wide variety of such dishes are commonly prepared in households and restaurants. Dried sliced potatoes are also widely used for household preparation, mainly for casseroles. For these, a packet of dried ingredients is furnished together with the dried potatoes for preparing the casserole. The dry ingredients include the thickening agents which combine with the water or milk added to the mixture to rehydrate the dried potatoes during baking. The dry mixture also contains optional ingredients such as seasonings, spices, dehydrated cheeses, and dehydrated vegetables, particularly dried onions.

It has been determined that the process of this invention can be applied to dried slices and utilized for casserole dishes without the use of the separately added packet of seasonings, thickeners, and other ingredients. In general, the separation particulate must be formed with particles with a size which corresponds to the size of the product being dried. For slices, which are typically larger than potato shreds utilized for hashbrowns, the size of the separation particles must also be proportionately larger.

EXAMPLE

Shredded Hashbrown Potatoes

Uncoated, plain potato shreds and dry mixture coated, treated shreds (hereinafter abbreviated "Control" and "Treated" products, respectively) were made and dried in a pilot plant as follows:

A bulk quantity of dry mixture (abbreviated hereinafter as "Dry Mix") containing desired air pathway forming separation particulates and hydrocolloid film-forming adhesive components (alginate and calcium salt), plus flavorings and browning agents, was made as follows:

Ingredient function codes:
F—Flavor
B—Browning during grilling
P—Particulates
A—Dry mix adhesive
D—Dust control
H—Hashbrown patty adhesive
T—Hashbrown texture enhancer

| Number | Function Code | Ingredient | % Dry Mix |
|---|---|---|---|
| 1 | A | Calcium chloride powder | 0.54 |
| 2 | A | Sodium alginate 1.53 (Protanal SF 120, Protan, Inc.) | 1.53 |
| 3 | B | Dextrose powder | 3.06 |
| 4 | B | Nonfat milk powder (−60 mesh screen) | 0.46 |
| 5 | D | Glycerol monooleate w/0.08% BHT (or other liquid high-stability lipid) | 0.92 |
| 6 | P, H | Raw potato starch | 15.31 |
| 7 | P, H | Raw "Dent" corn starch | 21.43 |
| 8 | P, T | Crushed dried potato dice (87% −40 screen) | 27.56 |
| 9 | F, P | Onion, granulated | 3.83 |
| 10 | F | Sodium chloride | 16.84 |
| 11 | F | Potato flavor profile ingredients (Willard U.S. Pat. No. 4,698,230) | |
| | | 11a. Toasted potato flakes | 0.61 |
| | | 11b. Sucrose | 7.65 |
| | | 11c. Citric acid | 0.03 |
| | | 11d. Malic acid | 0.02 |
| | | 11e. Potassium chloride | 0.21 |

Ingredients 11a through 11e are potato flavor profile ingredient as disclosed in U.S. Pat. No. 4,698,230. Dry mixture ingredients were homogeneously blended in three parts. Part "A" consisted of blending sodium chloride, sucrose, citric acid, malic acid, and calcium chloride for 1 minute in a Leland Model 1000A food mixer, then adding warm, liquefied glycerol monooleate (abbreviated hereafter as "GMO") over 1 minute, followed by approximately 8 minutes additional mixing to thoroughly disperse the GMO. Any liquid high-stability fat (oil) will substitute for GMO for the purpose of dust control at the same level of application. Part "A" mixture was then transferred to a Marion Model FPS-2436 Mixer, set at 65-70 revolutions per minute. Part "B" consisting of potato starch and corn starch was added to the Marion Mixer and mixing continued until dust subsided, approximately 5 minutes. Finally, Part "C", consisting of all remaining ingredients, was added to the Marion Mixer and mixing continued until salt analysis indicated a homogeneous mixture (approximately 17% salt), which required about 10 minutes. Blended Dry Mix was stored in poly-lined paper bags until used.

Idaho Russet potatoes were peeled, trimmed, cut to a maximum length of 2.50 inches and cut into shreds with an Urschel Model CC cutter equipped with number 22065 Crinkle blades, offset to produce shreds (instead of crinkle slices). Freshly cut potato shreds were thoroughly rinsed in copious amounts of cool tap water to remove native surface starch. After rinsing, shreds were dipped in a 200 ppm sulfite solution (sodium metabisulfite in cool tap water) for approximately 1 minute, then drained.

Rinsed, sulfite-treated shreds were then blanched in a steam cabinet under atmospheric steam, twenty pounds at a time, evenly distributed over four trays with screen bottoms, for 3½ minutes. Blanched shreds were then quickly transferred to a wire basket immersed in a barrel of cool tap water. Immersed shreds were agitated in the cool water until cooled below 75° F. then removed from water and drained in the wire basket, tilted at approximately a 45° angle to facilitate draining. Proper dewatering was achieved when nearly all drip ceased from the basket, approximately 10 minutes.

Blanched, dewatered potato shreds were divided into two portions: one portion for Control product (plain, uncoated shreds), and the other portion for Treated product (to be coated with the Dry Mix). Control and Treated products were stored in plastic pails and covered with plastic film to retain moisture until dried.

Control product was prepared by carefully weighing 21 pounds of blanched, drained shreds and distributing over a tared shallow dryer tray to a bed depth of approximately 2.25 inches.

Treated product was prepared as follows: 93.5% blanched, drained shreds; 6.5% bulk blend Dry Mix. Coating of shreds with Dry Mix was done in a lab seasoning tumbler which consisted of a motorized 55 gallon plastic drum tilted approximately 15° from horizontal, flights removed, rotating at 24 revolutions per minute. Dry Mix was added by shaking onto tumbling shreds over 15 seconds and tumbling continued for an additional 60 seconds. Initially, the mass of Treated shreds was quite sticky and cohesive. By the end of the mixing the coated shreds had a waxy, slightly cohesive texture with a mealy, fluffed, or "open" appearance. Twenty-one pounds of shreds dough was carefully weighed and spread over a tared dryer tray in the same manner as the Control product above. Bed depth was approximate 2.5 inches. The difference in bed depths indicates the open, fluffed state of the Treated product which creates the air pathways which improve drying and reduce sticking.

Bulk densities for Control and Treated products before drying was 31.6 and 32.3 pounds per cubic foot, respectively. The tray of Control shreds and tray of Treated shreds were placed in a Proctor And Schwartz Model 8078A test dryer for drying (hereinafter abbreviated "P&S dryer").

Drying was conducted in several stages, which is common practice in the art. In Stage #1, air was maintained at 200° F. at a velocity of about 400 feet per minute through the trays. Drying was monitored by weighing each tray of product at approximately 5-minute intervals to determine drying rates. After weighing, each tray was turned end-for-end and dryer shelves exchanged to ensure each product received the same average drying environment. Airflow was changed from upflow to downflow after 15 minutes. The conditions of Stage #1 drying were maintained for a period sufficient to dry the shred surfaces so that they could be removed from Stage #1 and dried in a deeper bed in Stage #2 without sticking together. This state is normally achieved at a moisture content between 45% to 55% and is characterized by a "leatheriness" of individual shreds. More extended drying in Stage #1 can result in product scorching, reduced production, and excessive fuel cost. Transfer from Stage #1 of insufficiently dried shreds can result in matting and sticking during Stage #2 with resultant formation of blow holes and non-uniformly dried product.

The Treated product dried quickly and uniformly in Stage #1 as a result of the increased passage of a air between shreds provided by the occluded particulates. There were no wet, matted-down zones with this product and only a minor amount of slightly over-dried shreds at the periphery, the latter being unavoidable in stationary batch-type driers. There was no sticking to the tray.

The Control product did not produce an evenly dried bed in Stage #1. Large internal zones of wet, matted shreds were noted, as well as excessively dry peripheral areas, especially certain areas near holes which had been blown through the bed of product as a result of air blockage by the zones of wet shreds. Establishing the end of Zone #1 for Control shreds was made by drying the trays to approximately the same degree of weight loss. By mixing the under-and over-dried shreds manually prior to beginning Stage 2, the Control Product could be dried further without scorching the over-dried shreds in the same trays. In every case, at the end of Stage #1, the Control Product strongly adhered to the tray and was difficult to remove.

At the end of Stage #1 drying, each product was removed from its tray and dumped into a plastic barrel. The shreds were pulled apart, then gently but thoroughly mixed. Samples for moisture analysis were taken. Control shreds were more difficult to pull apart and breakage occurred due to overly dry shreds. Treated shreds, being more uniformly dried and leathery did not break and parted more easily.

The drying rates for the Control and Treated product are shown below in Table 1, and are based on an initial moisture content of 83% for the blanched, washed shreds.

TABLE 1

| Time Minutes | Control Moisture (a) | | Treated (as is) Moisture | | Treated (adjusted) Moisture (b) | |
|---|---|---|---|---|---|---|
| | % | W/S | % | W/S | % | W/S |
| 0 | 83.0 | 4.88 | 78.0 | 3.57 | 83.0 | 4.88 |
| 6 | 81.2 | 4.32 | 74.0 | 2.85 | 79.0 | 3.76 |
| 10 | 78.8 | 3.73 | 70.9 | 2.44 | 75.9 | 3.15 |
| 15 | 76.5 | 3.26 | 65.0 | 1.86 | 70.0 | 2.33 |
| 21 | 73.5 | 2.77 | 60.3 | 1.52 | 65.3 | 1.88 |
| 25 | 70.9 | 2.44 | 47.8 | 0.92 | 52.8 | 1.12 |
| 30 | 67.8 | 2.11 | — | — | — | — |
| 35 | 59.2 | 1.45 | — | — | — | — |
| 37 | 53.4 | 1.15 | — | — | — | — |

(a) Water/solids ratio
(b) Adjusted for 5% solids added to shreds before drying

Figure 6:
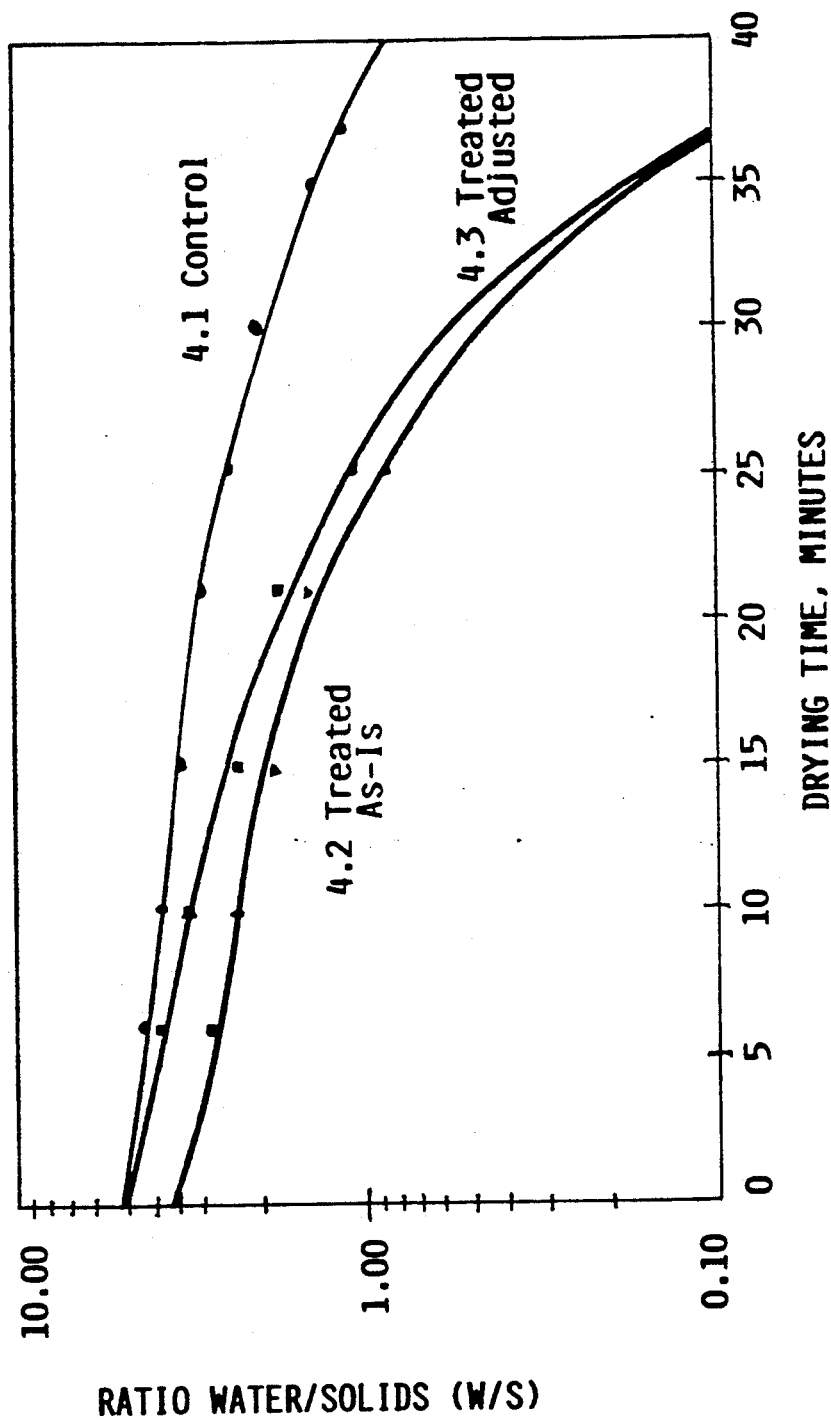
FIG. 6 is a graph showing the drying rate of potato shreds processed in accordance with invention compared to the drying rate of untreated shreds.

The Treated product contained 5% additional dried ingredients, resulting in a starting moisture content of 78% in contrast to the 83% for the Control product. FIG. 6 shows conventional drying rate curves for the above data. Plot 4.1 of water/solids ratio (W/S) versus drying time illustrates the loner drying time required for the Control product compared to Plot 4.2 for the Treated product. The adjusted drying rate calculated for the shreds only in the Treated sample is shown as Plot 4.3. At about W/S=1.9 to 2.0, the reduction in rate of water removal has reached the point where movement of water to the surface by capillary action stops (FOOD DEHYDRATION, Van Arsdale and Copley, AVI, 1963, p. 95).

Upon completion of mixing after Stage #1, both products were placed in a single deep tray separated by a divider. Bed depths were adjusted to 6 inches for each product. Products were finish dried together at 180° F. at an air velocity of about 400 feet per minute through the product beds. Air flow was reversed between upflow and downflow at 20-minute intervals. Stage #2 drying time was 40 minutes for both products. Final moistures were 7.4% for Control product and 10.0% for Treated product. Dried products were equilibrated in plastic food bags until further analyzed and sensory evaluated.

Several days later, each product was rehydrated by covering dried shreds with 150° F. tap water in a glass beaker (6:1 water to shreds ratio). Temperatures of each beaker of product equilibrated to about 140° F. immediately. Beakers were placed in a temperature controlled water bath at 140° F. and rehydration ratios (wet/dry weights) were monitored by draining and weighing shreds, until a target rehydration value of 4.0 (wet/dry) was achieved. Once optimum rehydration times were established, new batches of Control and Treated products were optimally rehydrated for grilling and sensory evaluations. A fabricated, dehydrated commercial hashbrown product, Redi-Shreds TM (Basic American Foods, Blackfoot, Id.) was also optimally rehydrated per package instructions for product preference sensory evaluations.

Each of the three products were simultaneously grilled on a commercial gas grill at 375° F. "to color". Effort was made to achieve the same degree of browning for each product. Each product had a distinct hue of brown which could not directly relate one to another.

Data from repetitive grillings by three lab technicians showed Redi-Shreds TM formed significantly stronger patties and were most easy to manipulate on the grill. Treated product was deemed acceptable in handling, but the patties were less cohesive that Redi-Shreds TM. Untreated shreds were difficult to handle because they were lacking any cohesive property, resulting in an "all-over-the-grill" effect; patty forming was nil. Thus, Control product was difficult to turn with a spatula.

Figure 5:
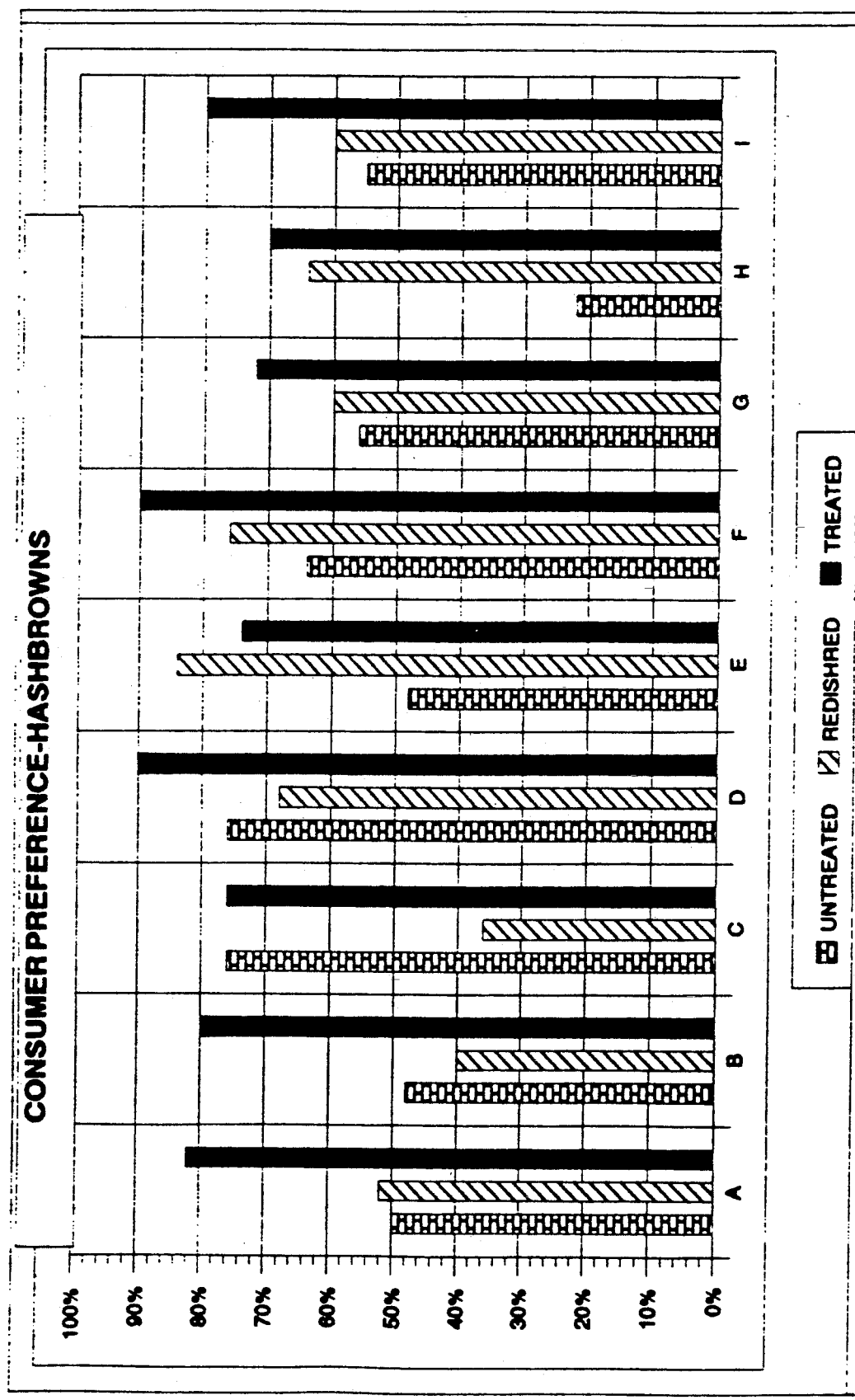
FIG. 5 is a graph of a consumer preference test comparing untreated potato shreds, a commercially available Redi-Shred TM product, and treated potato shreds processed in accordance with the invention.

Grilled products were coded and presented to seven uninformed consumer panelists for preference evaluation of key characteristics and overall preference. Treated shreds were preferred over Redi-Shreds TM in all categories except mouthfeel. Treated shreds outscored Control shreds in all categories, except matched scores in crispness. Treated shreds was preferred overall. The graphic results of the consumer preference test are illustrated in FIG. 5. The following key applies to the chart of FIG. 5:
KEY:
A=Visual Appeal
B=Color
C=Crispness
D=Bite of Single Shred
E=Mouthfeel
F=Moistness
G=Oiliness
H=Flavor
I=Overall Preference In general, panelists responses were based on perception of ideal hashbrowns, not judging one product against another.

It has been observed in repetitive lab grillings that Treated shreds retain crispness significantly longer than Redi-Shreds TM or Control shreds. Treated, grilled shreds retain nearly full crispness up to 30 minutes, while Redi-Shreds TM and Control shreds significantly decline in crispness. It has also been noted that if rehydration of Redi-Shreds TM is continued beyond the stated conditions, the product becomes soft and mushy.

While the process of the invention has been described with reference to preferred embodiments thereof, as will be apparent to those skilled in the art, certain changes and modifications can be made without departing from the scope of the invention as defined by the following claims.

What is claimed is:
1. A method of dehydrating a potato product comprising:
   a. cutting the potato product into individual pieces;

b. forming an adhesive surface on the individual pieces;

c. coating the individual pieces with a separation particulate in order to separate the individual pieces and form air pathways therebetween for drying; and then d. drying the separated pieces by directing air around and between the separated pieces.

2. The method as recited in claim 1 and further comprising:

forming an adhesive surface on the individual pieces by the addition of adhesive elements to the separation particulate which react with moisture on a surface of the individual pieces for adhering the separation particulate to the individual pieces.

3. The method as recited in claim 2 and wherein:
the adhesive elements are contained in a dry mixture which also contains the separation particulate.

4. The method as recited in claim 3 wherein the individual pieces are:
elongated potato shreds suitable for hash brown potatoes, and further comprising mixing flavorings, browning and patty-binding ingredients with the dry mixture.

5. The method as recited in claim 4 and wherein:
the adhesive surface is formed by a pregelatinized starch included with the dry mixture which reacts in the presence of moisture on the potato shreds.

6. The method as recited in claim 4 and wherein:
the adhesive surface is formed by residual native potato starch on the cut potato shreds.

7. The method as recited in claim 4 and wherein:
the adhesive surface is formed from the reaction of an anionic hydrocolloid and cationic polyvalent food-grade salt combined with the separation particulate, in the presence of moisture on a surface of the potato shreds.

8. The method as recited in claim 7 and wherein:
the anionic hydrocolloid is selected from the group consisting of algin, alginate, sodium alginate, and potassium alginate.

9. The method as recited in claim 7 and wherein:
the anionic hydrocolloid is selected from the group consisting of low-methoxyl pectin, sodium pectinate, potassium pectinate, and amidated pectin.

10. The method as recited in claim 4 and wherein:
the adhesive surface is formed from the reaction of alginate and calcium salt included within the dry mixture in the presence of moisture on the potato shreds.

11. The method as recited in claim 4 and wherein:
the separation particulate includes comminuted potato particles applied to the potato shreds prior to drying.

12. The method as recited in claim 4 and wherein:
previously dried shredded potatoes are mixed with the potato shreds prior to drying.

13. The method as recited in claim 1 and wherein:
forming an adhesive surface on the individual pieces is by the application of adhesive forming elements to the individual pieces.

14. The method as recited in claim 1 and further comprising:
rehydrating the dry separated pieces by immersion in water.

15. A method of producing dehydrated potato pieces comprising:

a. cutting potatoes into separate pieces;

b. blanching the potato pieces;

c. forming an adhesive surface on the potato pieces;

d. applying a separation particulate to the potato pieces in order to maintain separation of the potato pieces and form air pathways therebetween for drying; and then e. drying the separate potato pieces by directing heated air around and between the separate pieces.

16. The method as recited in claim 15 and wherein:
the adhesive surface is formed by residual native potato starch formed from cutting the potatoes.

17. The method as recited in claim 15 and wherein:
the separation particulate is included in a dry mixture applied to the potato pieces.

18. The method as recited in claim 17 and wherein:
the dry mixture includes ingredients which react in the presence of moisture on the potato pieces to form the adhesive surface.

19. The method as recited in claim 18 and wherein:
the dry mixture includes pregelatinized starches which form an adhesive surface on the potato pieces.

20. The method as recited in claim 18 and wherein:
the dry mixture is combined with a mucilaginous substance which forms an adhesive surface on the potato pieces.

21. The method as recited in claim 18 and wherein:
the dry mixture includes alginate and soluble calcium salt which react to form an adhesive surface.

22. The method as recited in claim 15 and wherein:
the separation particulate includes comminuted potato particles.

23. The method as recited in claim 15 and comprising:

a. cutting the potato pieces into elongated shreds suitable for hashbrown potatoes; and b. applying a dry mixture containing the separation particulate, flavorings, browning ingredients, and patty-binding ingredients for forming hashbrown potatoes to the potato shreds.

24. The method as recited in claim 23 and wherein:
the adhesive surface is formed from the reaction of an anionic hydrocolloid and cationic polyvalent food-grade salt included in the dry mixture which reacts with moisture on the potato shreds.

25. The method as recited in claim 24 and wherein:
the anionic hydrocolloid is selected from the group consisting of algin, alginate, sodium alginate, and potassium alginate.

26. The method as recited in claim 24 and wherein:
the anionic hydrocolloid is selected from the group consisting of low-methoxyl pectin, sodium pectinate, potassium pectinate, and amidated pectin.

27. The method as recited in claim 24 and wherein:
the polyvalent cationic salt includes any food-grade salt.

28. The method as recited in claim 15 and wherein:

a. the potato pieces are sliced and suitable for use in casserole dishes; and b. the separation particulate includes flavorings, dehydrated vegetables, and dehydrated cheeses.

29. A method of producing a dehydrated hashbrown potato product which, when rehydrated and fried, simulates freshly cut hashbrown potatoes, said method comprising:

a. peeling, trimming, and cutting potatoes into thin elongated shreds;

b. washing the potato shreds;

c. blanching the potato shreds;

d. applying a dry mixture containing a separation particulate and adhesive forming ingredients to the potato shreds;
e. forming an adhesive surface and adhering the separation particulate to the potato shreds by reaction of the adhesive forming ingredients in the dry mixture in the presence of moisture on the potato shreds such that the potato shreds are separated with air pathways formed between the potato shreds;
f. drying the separated potato shreds, by directing heated air around and between the separated shreds, to a moisture content of less than about 10%; and then
g. packaging the dried potato shreds.

30. The method as recited in claim 29 and wherein: the dry mixture contains flavorings, browning ingredients and patty-binding ingredients.

31. The method as recited in claim 29 and wherein: the potato shreds are dried in a multi-stage hot-air conveyer dryer.

32. The method as recited in claim 29 and wherein: the dry mixture includes raw starches.

33. The method as recited in claim 29 and wherein: the dry mixture includes crushed dehydrated potatoes.

34. The method as recited in claim 33 and further comprising:
h. rehydrating the dried potato shreds in water; and
i. frying the rehydrated potato shreds.

35. The method as recited in claim 29 and wherein: comminuted blanched potato particles are applied to the potato shreds as a separation particulate.

36. A method of producing a dehydrated potato piece which can be rehydrated and cooked as a casserole dish comprising:
a. peeling, trimming, and cutting potatoes into slices;
b. washing the potato slices;
c. blanching the potato slices;
d. applying a dry mixture containing a separation particulate, adhesive forming ingredients, flavorings, dehydrated cheeses and dehydrated vegetables to the potato slices;
e. forming an adhesive surface on the potato slices by reaction of the adhesive forming ingredients in the dry mixture in the presence of moisture on a surface of the potato slices whereby the separation particulate adheres to the potato slices to maintain separation of the potato slices and form air pathways between the separated potato slices;
f. drying the separated potato slices, by directing heated air around the potato slices and through the air pathways, to a moisture content of less than about 10%; and then
g. packaging the potato slices.

37. A method as recited in claim 36 and wherein: the dry mixture includes a thickening agent which combines with water used to rehydrate the potato slices during a cooking step.

38. A method as recited in claim 36 and further comprising:
h. rehydrating the dried potato slices by immersion in water.

39. A method of producing a dehydrated hashbrown potato product which, when rehydrated and fried, simulates freshly cut hashbrown potatoes, said method comprising:
a. peeling, trimming, and cutting potatoes into thin elongated shreds;
b. washing the potato shreds;
c. blanching and dewatering the potato shreds;
d. applying a dry mixture containing flavorings, a separation particulate and adhesive forming ingredients to the potato shreds;
e. adding to the potato shreds previously dried shredded potatoes;
f. forming an adhesive surface and adhering the dried, shredded potatoes and the dry mixture to the potato shreds by reaction of ingredients in the dry mixture in the presence of moisture on the potato shreds whereby the elongated shredded potatoes are separated by the separation particulate and air pathways are formed between the separated shreds for drying;
g. drying the separated potato shreds, by directing heated air around the shreds and through the air pathways, to a moisture content of less than about 10%; and then
h. packaging the dried potato shreds.

40. The method as recited in claim 39 and wherein: the previously dried, shredded potatoes are added in an amount of between 1% and 20% by weight of the blanched, dewatered potato shreds.

41. The method as recited in claim 39 and wherein; the previously dried, shredded potatoes added in an amount of about 5% by weight of the blanched, dewatered potato shreds.

42. A method of producing a dehydrated hashbrown potato product which, when rehydrated and fried, simulates freshly cut hashbrown potatoes, said method comprising:
a. peeling, trimming, and cutting potatoes into thin elongated shreds;
b. washing, blanching, and dewatering the potato shreds;
c. adding comminuted blanched potato particles to the shreds;
d. applying a dry mixture containing flavorings and adhesive forming ingredients to the potato shreds;
e. forming an adhesive surface and adhering the dry mixture and comminuted blanched potato particles to the potato shreds by reaction of the adhesive forming ingredients in the dry mixture in the presence of moisture on the potato shreds whereby the potato shreds are separated by the comminuted potato particles and air pathways are formed between the shreds for drying;
f. drying the separated potato shreds, by directing heated air around and through the separated potato shreds, to a moisture content of less than about 10%; and then
g. packaging the dried potato shreds.

43. A method as recited in claim 42 and wherein: the comminuted blanched potato particles are comminuted to a size sufficient to allow air flow between the shreds during drying.

44. The method as recited in claim 42 and wherein: the dry mixture contains a separation particulate.

45. A product formed by the process of claim 42.

* * * * *